United States Patent Office 3,305,885
Patented Feb. 28, 1967

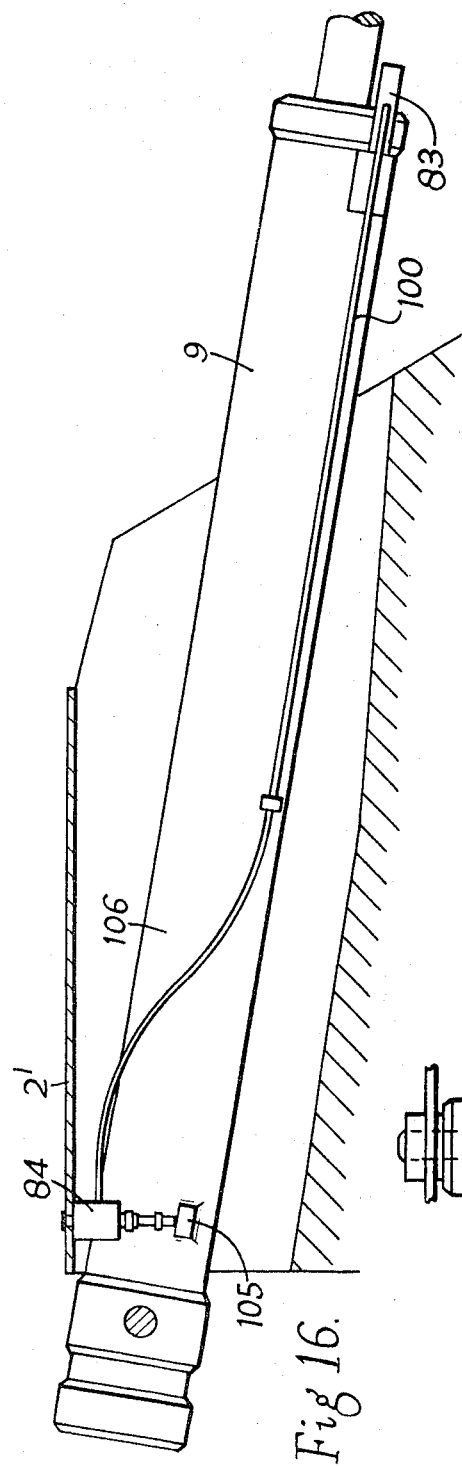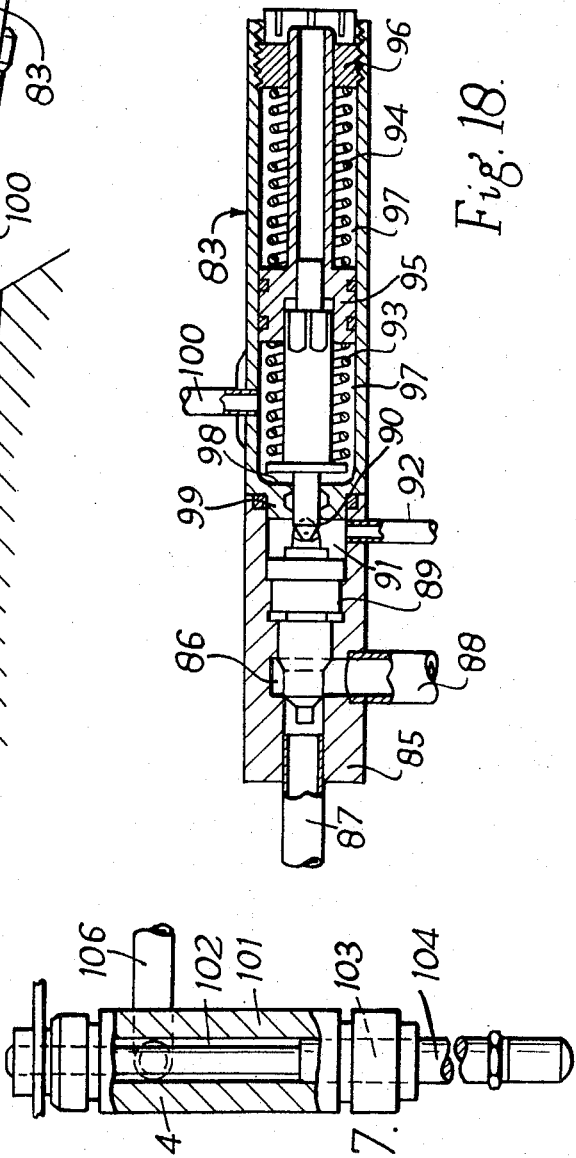

3,305,885
BRIDGE-LAYING VEHICLE
Jean Vaillant and Alexandre Vaugoyeau, both of
Saint Marcel, Marseille, France
Filed Sept. 13, 1965, Ser. No. 486,651
Claims priority, application France, Oct. 1, 1962,
19,885, Patent 1,339,046
5 Claims. (Cl. 14—1)

This is a continuation-in-part of our co-pending United States patent application No. 312,265 filed September 27, 1963, and now abandoned.

The purpose of the invention is to provide a hydraulic distribution-device which, associated with mechanical devices, enables a vehicle system to place a bridge over an obstacle or gap, on any type of ground, and withdraw it after use, this positioning and withdrawal of the bridge being effected even when the bridge and vehicle are on planes inclined longitudinally and transversally in respect of one another, or at different levels.

More particularly a bridge is used consisting of two hinged sections on the end of which there is provided a hollow truncated cone; it being pointed out that the bridge itself does not comprise any hydraulic device. The vehicle is equipped with retractible cams, for the purpose of increasing its supporting polygon, and with a tilting framework in the interior of which an engagement-device can pivot, the latter being of the shape of a truncated cone and its interior containing a jack the purpose of which is to extend the bridge.

The operation is effected by means of jacks which are controlled individually and which can be extended, contracted, locked or released by a manually controlled set of distributors. The distributor itself consists of a body equipped with cylinders of which the movements are controlled by levers setting up certain circuits, the operations of a pump being synchronised therewith.

According to another feature of the invention there is added an individual distributor system enabling the action of a coil to be eliminated, so that the operating devices are released and capable of orienting themselves automatically without restriction towards the bridge lifting devices, whatever the angle formed between the bridge laying gear and the bridge itself, an assembly of folding panels being provided in order to ensure a continuous surface from one side of the bridge to the other. Further, in order to prevent parts from breaking as a result of variations in the span, or other variations, a differential valve is provided to produce an invariable operating torque if the bridge assumes an abnormal position or is accidentally subjected to an excessive load.

In the accompanying drawings, provided by way of example of the best mode known, without any limitative effect, of one of the forms which can be taken by the invention:

Figure 8:
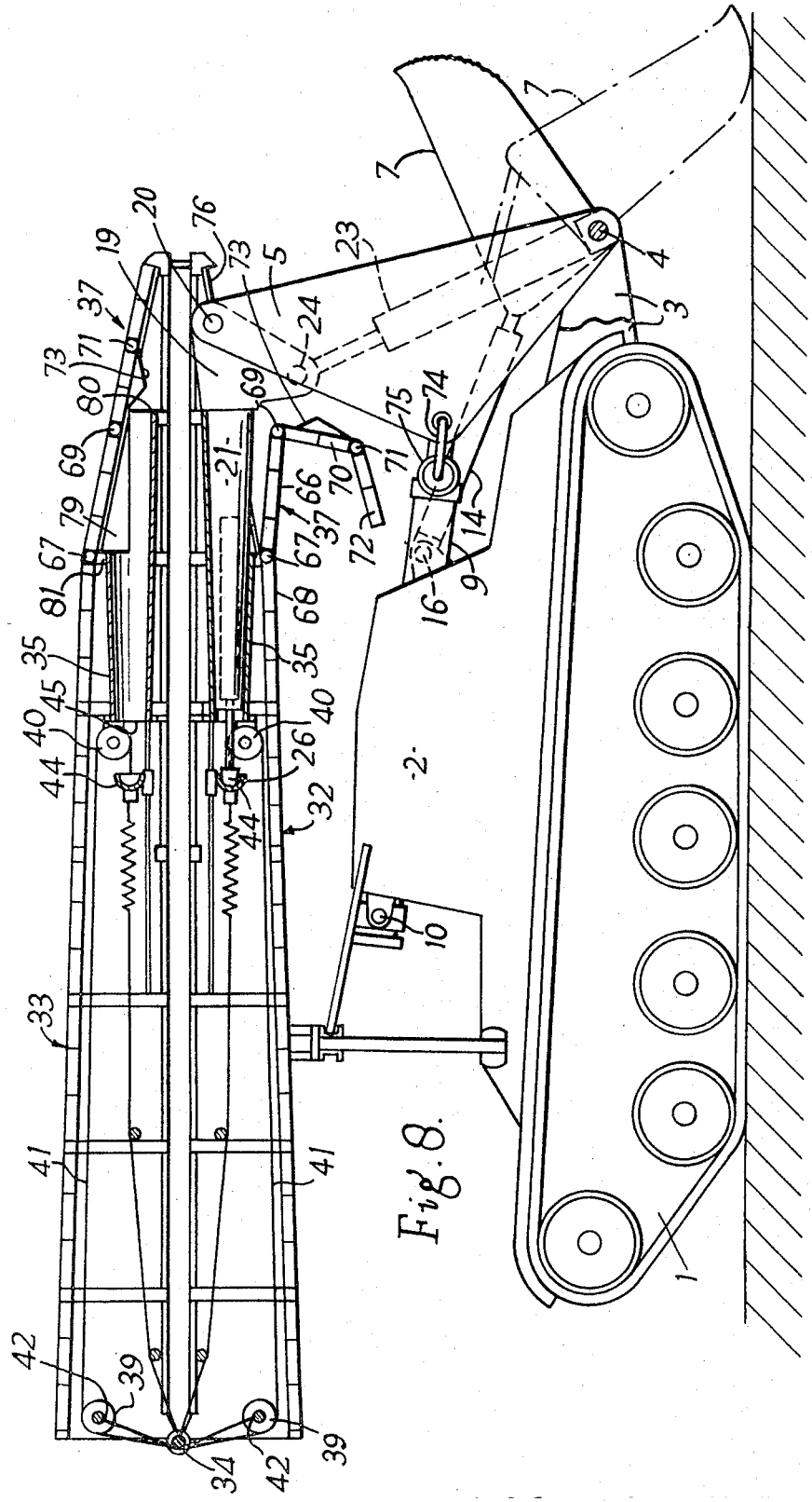
Figure 9:
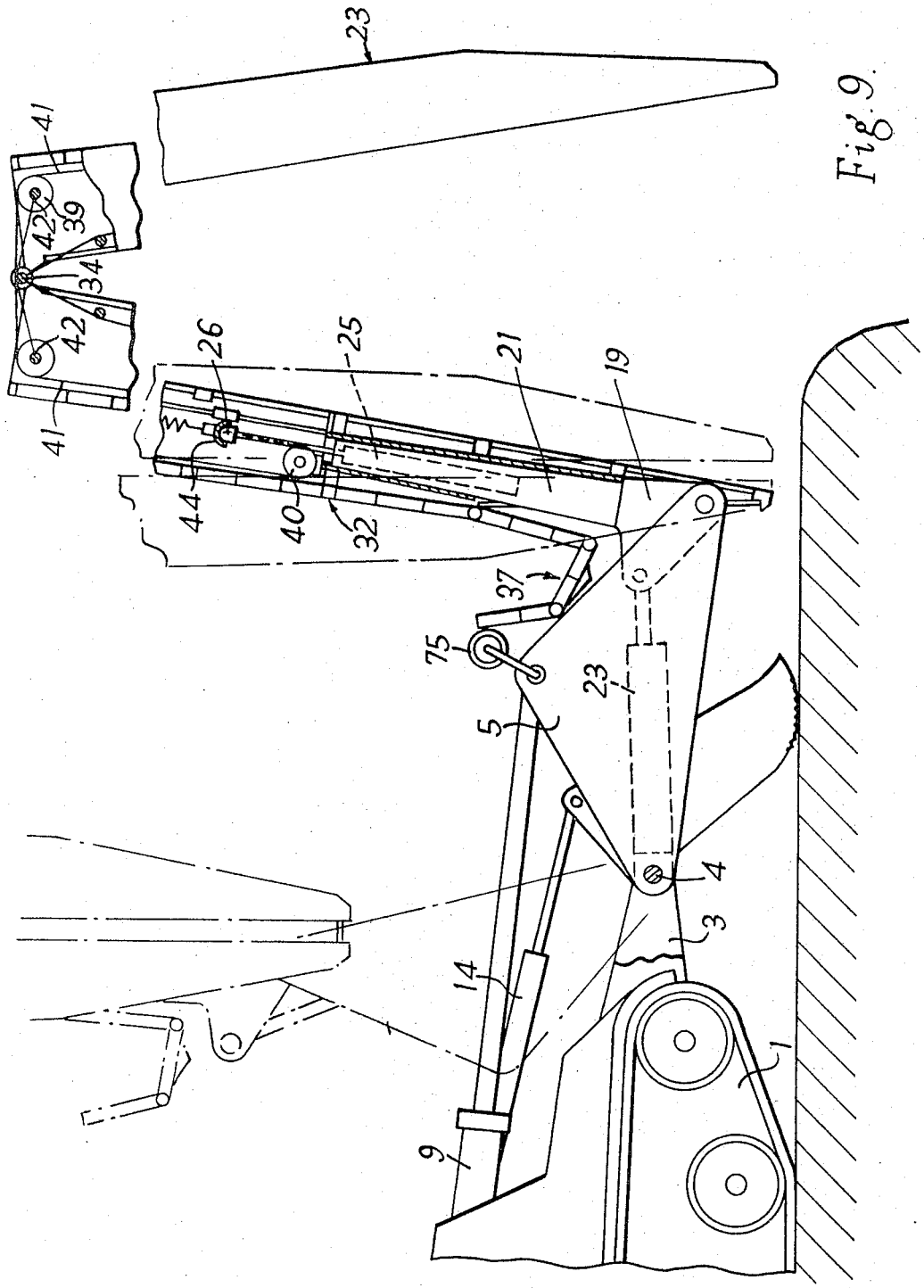
Figure 10:
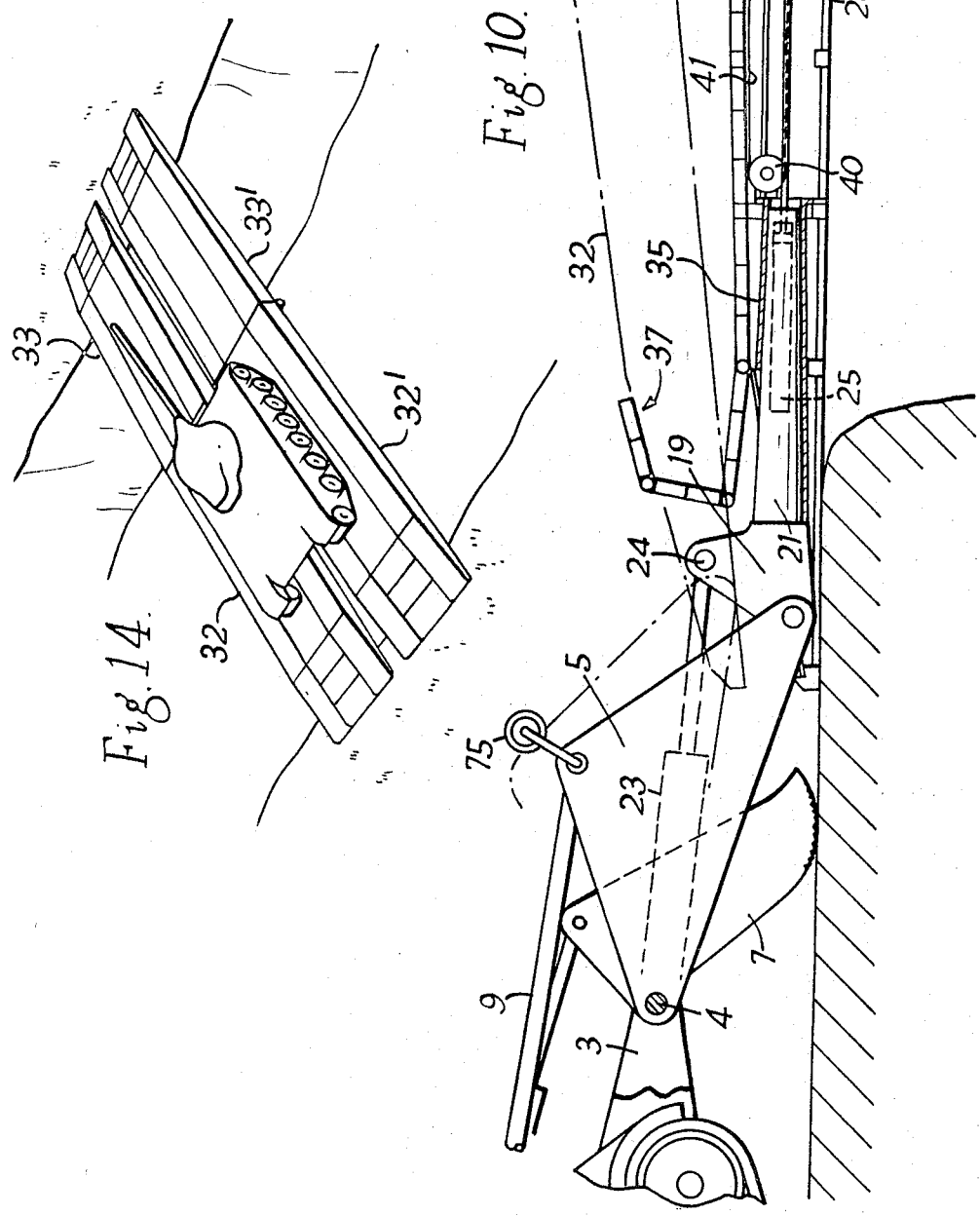
Figure 11:
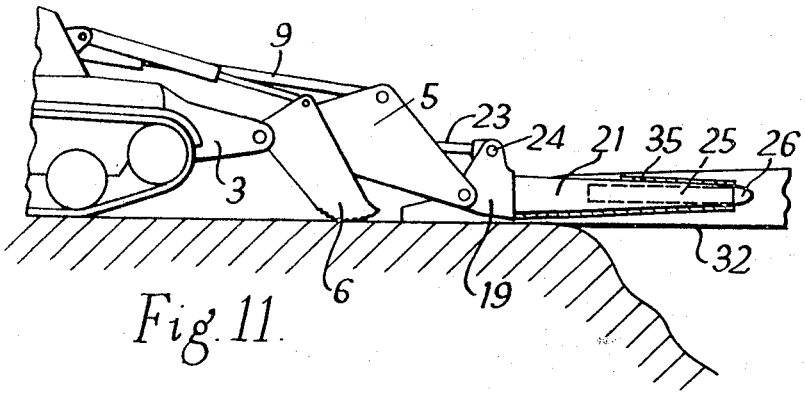
Figure 12:
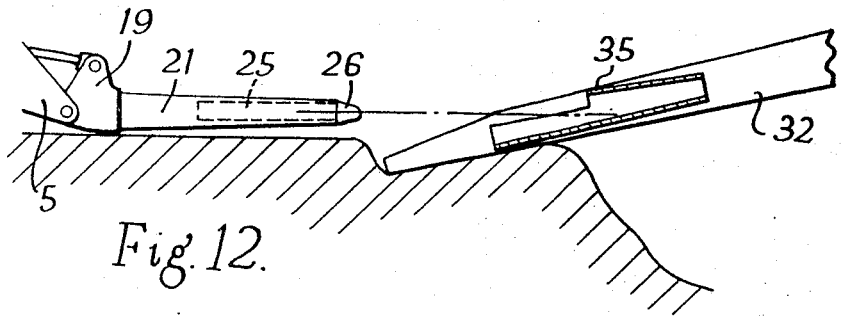
Figure 13:
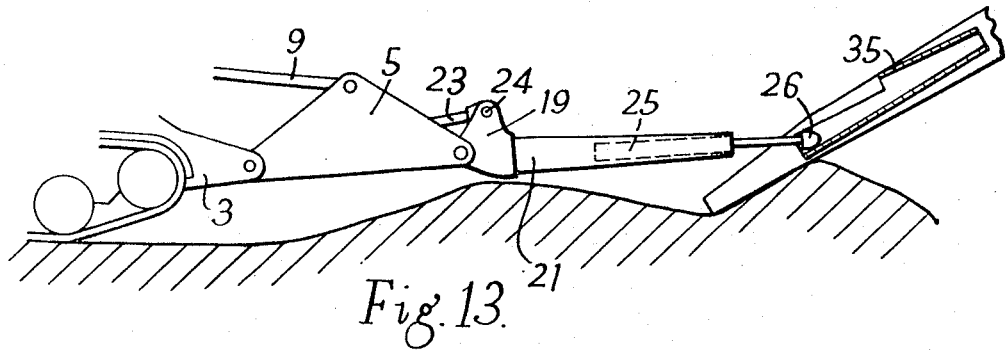

FIGS. 4, 5, 6, and 7 illustrate the operation of the hydraulic distribution system;

FIGS. 8, 9 and 10 show the application and operation of the extensible bridge operated control system;

FIGS. 11, 12 and 13 indicate the positions which the operating cone assumes in respect of the receiving device for the bridge;

FIG. 14 shows the combination of two bridges with articulated supporting panels lining the axial indentations; and FIGS. 15, 16, 17 and 18 show the safety device by which the hydraulic pressures are balanced.

Figure 1:
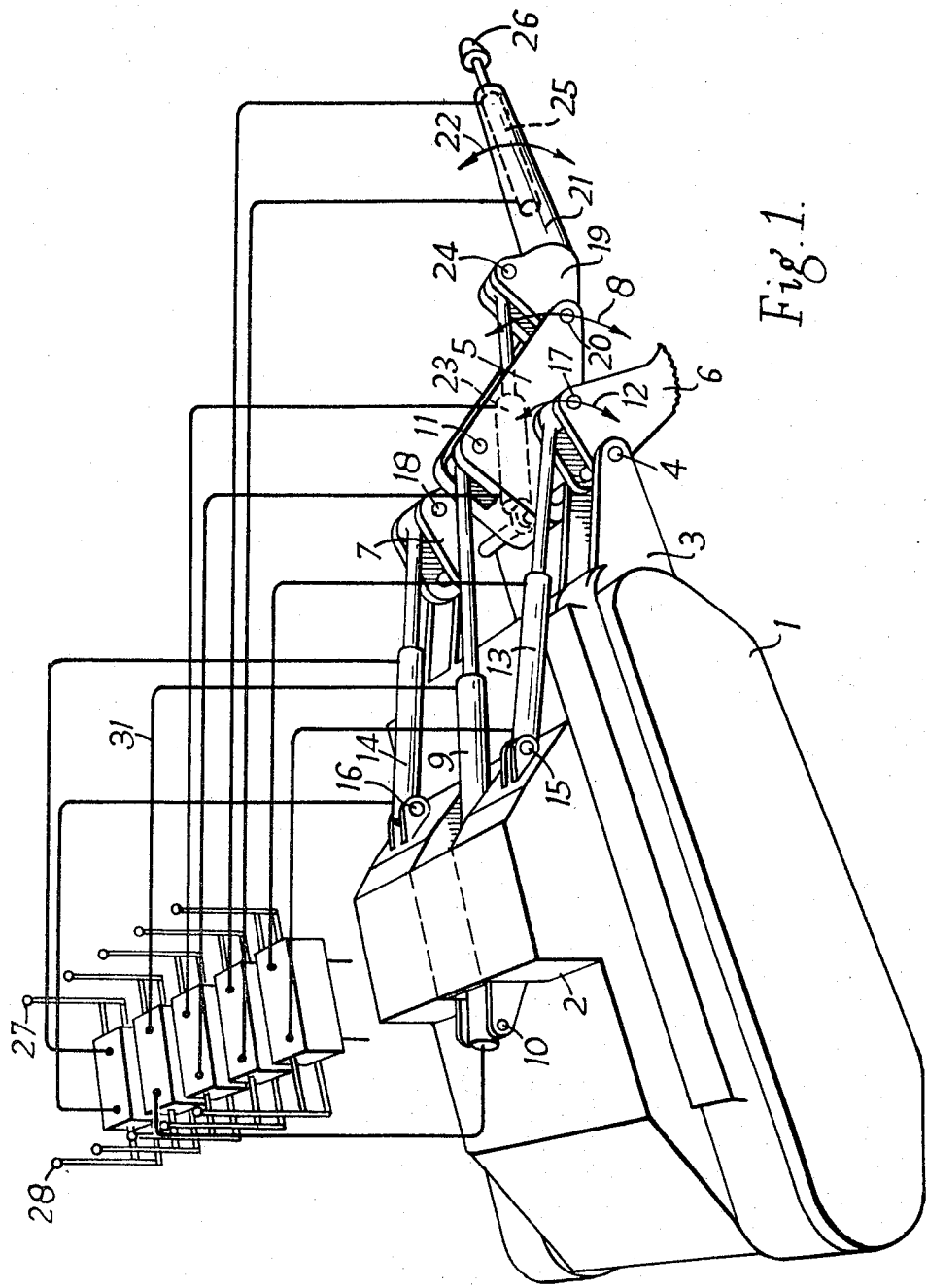
FIG. 1 shows, in perspective, a vehicle equipped with a hydraulic bridge device.

Referring to the drawings, and FIG. 1, in particular, the apparatus consists of a tank 1, provided with a casemate 2 and an abutment 3 having a shaft 4, to which are articulated a triangular support 5 and cams 6 and 7.

The support 5 can effect a rotary movement 8 around the shaft 4; this movement is transmitted by the double-acting jack 9, mounted on the casemate 2, by the aid of a journal 10, connected at its opposite end by the journal 11 to the support 5.

The cams 6 and 7 can also perform a rotary movement 12, transmitted by the double-acting jacks 13 and 14, mounted at their base on the journals 15 and 16, integral with the casemate, and at their opposite end by the journals 17 and 18, connected to the cams 6 and 7.

A part 19, held by the support 5, is articulated to the journal 20.

This part 19 terminates in a hollow truncated cone 21, and the entire unit, consisting of the part 19 and the truncated cone 21, can perform a rotary movement 22, set up by the double-acting jack 23, of which the base pivots on the shaft 4 and of which the head is connected to the part 19 by a journal 24.

Inside the truncated cone 21 there is double-acting jack 25 of which the head is fitted with a half-sphere 26, which constitutes the head of the truncated cone when the jack is compressed as far as it will go.

Figure 3:
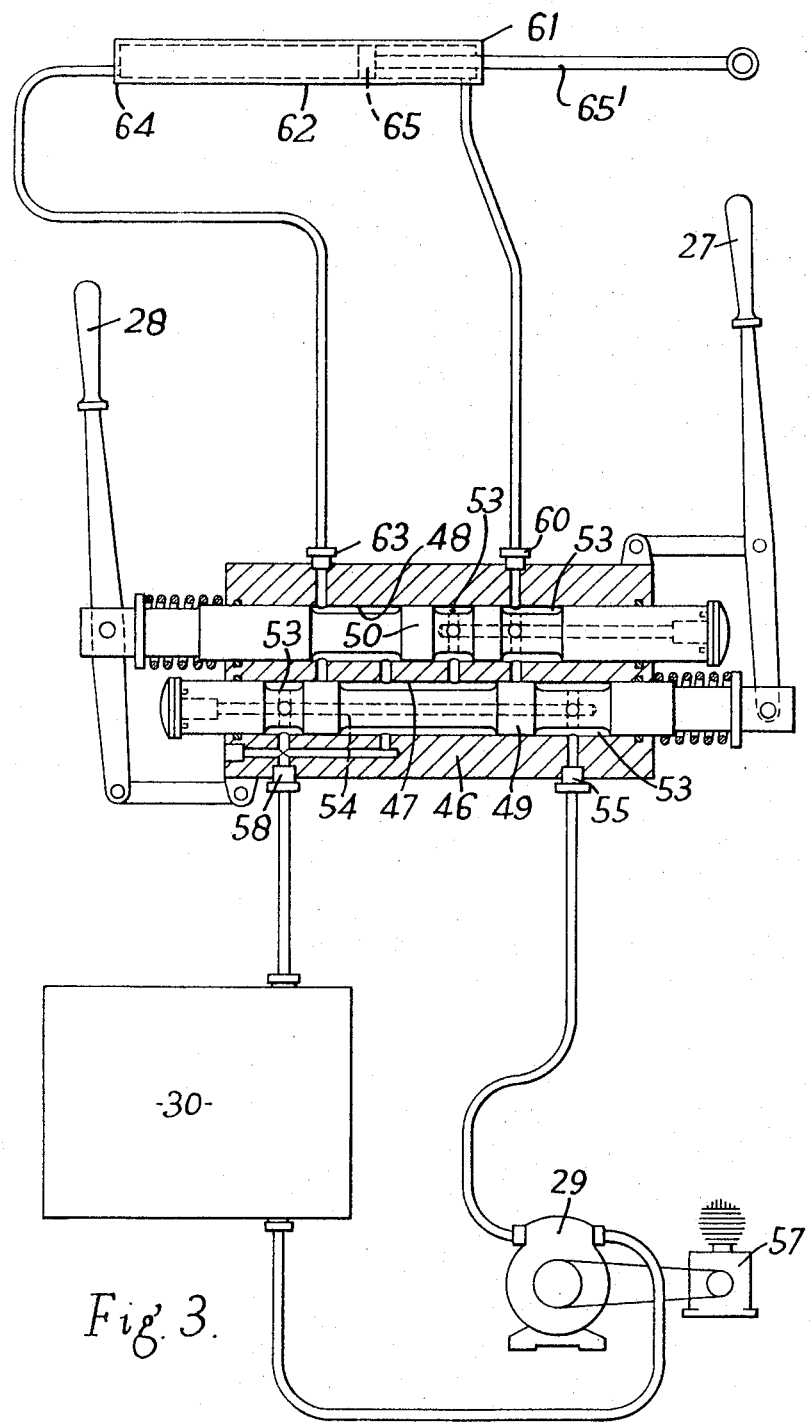
FIG. 3 is a longitudinal section through the hydraulic distribution device.

The jacks 9, 13, 14 and 23 are connected by flexible tubes 31 to each of the distribution devices, fitted with control-levers 27 and 28, providing a means of conveying the fluid, under pressure, obtained by a pump 29 driven by the motor of the vehicle and taking it from the storage tank 30 (see FIG. 3).

Figure 2:
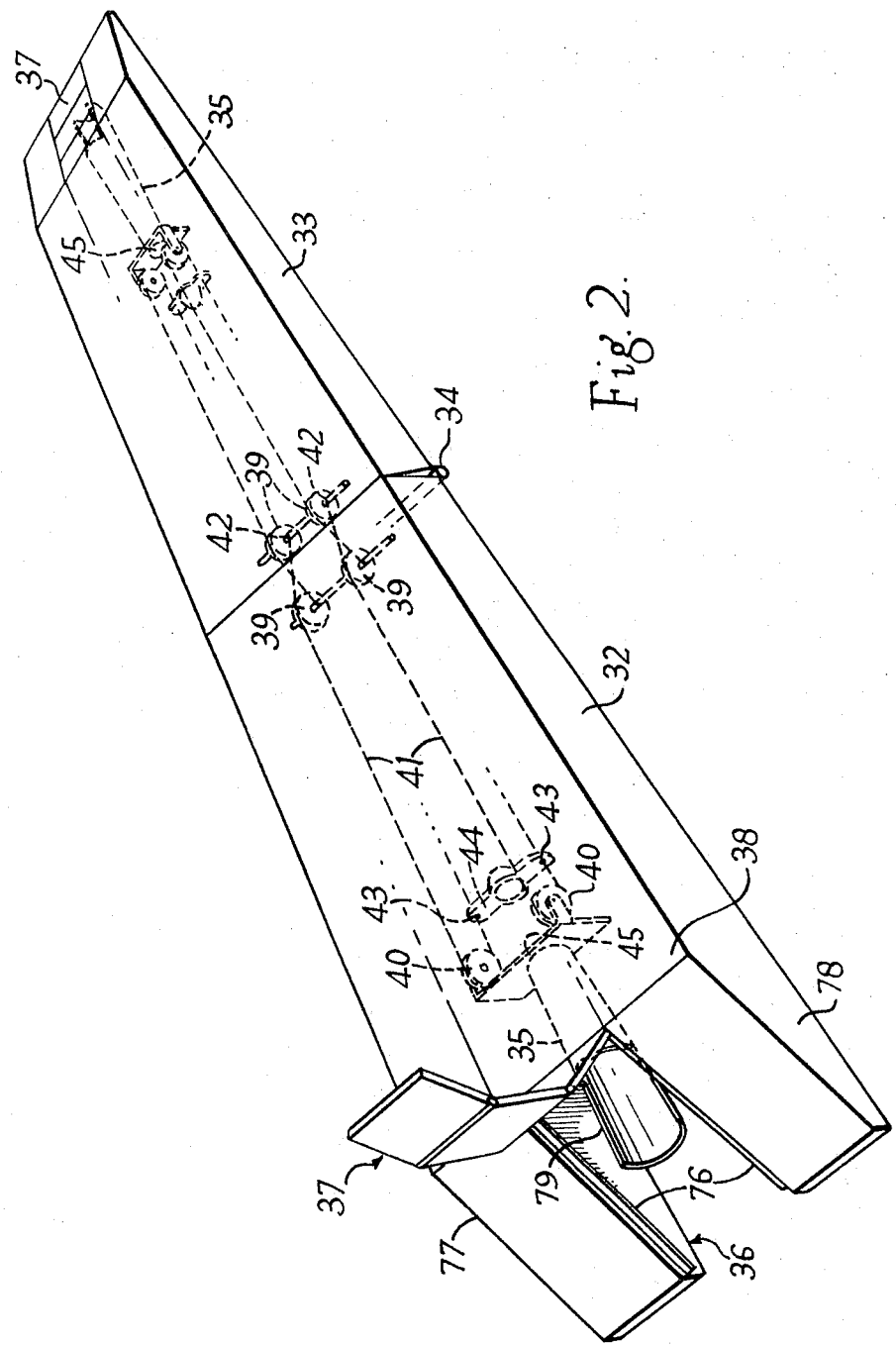
FIG. 2 shows, in perspective and schematically, the extensible bridge system which is combined with the vehicle.

The bridge, according to FIG. 2, consists of two half-bridges 32 and 33, articulated to a transverse central shaft 34, by which they are connected together. The end of each half-bridge bears a hollow truncated cone 35, of which the dimensions correspond to those of the truncated cone 21.

The recess 36 which accommodates the hollow truncated cone 35 is covered by a movable panel 37, consisting of one or more parts, articulated transversally so that the floor 38 forms a continuous surface.

The central shaft 34 serves as a pivot for the two half-bridges 32 and 33. Chains 41, of which one end, 42, is attached via pulleys 39, to the top of the other half bridge, while its other end 43 is connected via pulleys 40 to a rocker 44 which is mounted horizontally opposite the opening 45 of the hollow truncated cone 35 are wound on the central shaft 34.

The distributor, as seen in FIGS. 3, 4, 5, 6 and 7, consists of a solid steel body 46 with two bores 47, and 48, in which pistons 49 and 50 move, these being operated by manually controlled levers 27 and 28.

The pistons 49 and 50 are equipped with circular cavities 53 and have internal bores 54. The body 46 has a conduit 55 connected to the delivery of the pump 29, operated by the motor 57, or a contact-part which, by a conduit 58, connects to the feed-tank 30. A conduit 60 connects to the head 61 of the jack 62. The conduit 63 connects to the base 64 of the jack 62.

The method of operation of this hydraulic device, and the advantages which it offers, will thus be obvious.

The bridge is positioned by the hydraulic controls. For this purpose, for each jack, the distributor makes it possible, by the operation of a lever 27, to convey the oil under pressure, to either one or the other of the two faces of the piston of the jack, so as to lengthen or shorten it, but it also makes it possible to lock the jack in any intermediate position (FIGS. 1, 2, 3, 4, 5, 6, 7).

On the other hand, the lever 28 makes it possible starting from a jack locked in any position, to release the said jack, so that if any external force independent of the oil pressure acts on the jack, the piston can move freely inside the jack without impeding the said force, or at all events having no other effect on it than that of deceleration.

The bridge itself, FIG. 2, comprises no hydraulic device. To position the bridge, the vehicle approaches in reverse, FIG. 8, then lowers the cams 6 and 7, while extending the jacks 13 and 14, by the injection of fluid under pressure. By this operation, the supporting-polygon of the vehicle is increased, and it is rendered absolutely stable.

The fact is that this safety is due to the mutual independence of the jacks 13 and 14, which enables one cam to be lowered in respect of the other, if the ground is less firm on one side than on the other, or if it is disturbed. The cams 6 and 7 resting firmly on the ground, the operator merely has to place the levers of the oil-distributors of the jacks 13 and 14 in the locking-position to obtain an absolutely firm seating.

From this moment onwards, the bridge can be extended, and positioned above the gap. For this purpose, the operator starts by lengthening the jack 9, which causes the support 5 to rotate, until the bridge reaches the vertical position, FIG. 9. The jack 9 is then locked, the jacks 23 and 25 being extended at the same time, which causes the bridge to rotate about the journal 20 and enables it to be extended, because the half-sphere of the jack 25, comes into contact with the rocker 44, displacing it, pulling the chains 41 from points 42 on the opposite half bridge member via the pulleys 39.

When the bridge has been extended about the gap and positioned more or less parallel to the ground, FIG. 10, the operator places the jack 9 and the jack 23 in the free position. The bridge, being no longer held, then descends, and positions itself wtihout strain on the banks of the gap, FIG. 10. The operation is rendered easier by the fact that the hydraulic system used therein obeys the normal laws of gravity. The bridge can be positioned without difficulty on any surface, firstly because the bridge is supported by the vehicle, via the parts 21 and 35, of which the conical shape enables them to rotate transversally in respect of each other, and secondly because in the first position the bridge no longer undergoes any strain which might arise from the rigidity of the jacks.

To release the bridge, the operator starts by contracting the jack 25, then the jacks 13 and 14, in order to raise the cams 6 and 7. It is then sufficient for him to move the vehicle forward, keeping the distributors of the jacks 9 ande 23 in the free position.

Owing to this free position, the support 5 and the cone 21 automatically take up the position which they will be caused to assume by the hollow cone 35 which will function as a guide for them, and there is therefore no danger that they will take the bridge along with them in their movement.

Without this release of the jacks, it is impossible for the vehicle to be released, as the operator would have to be able to guide the parts 21 and 35; otherwise the vehicle, in its forward movement, would cause the bridge to move with it. The parts 21 and 35 would thus function as a hook. Now the operator would in practice never be able to carry out this maneuver through the sight-slits of the vehicle.

Thanks to this hydraulic system, the operation of withdrawing the bridge is easy to perform. The operator merely has to maneuver the jacks in such a way as to introduce the head 26 of the cone 21 into the larger base of the hollow cone 35 and then release the jacks 9 and 23, reversing the direction of travel, for the hollow cone 35 will serve as a guiding device for the male cone 21, without strain.

Figure 4:
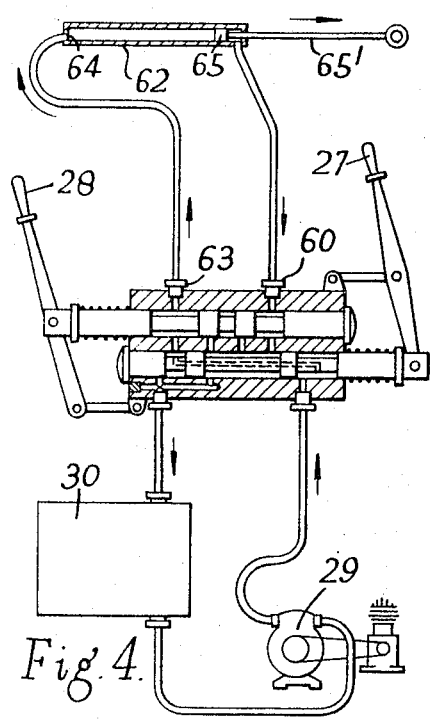

The operation of the distributor can be explained as follows:

When, owing to the movement of the levers 27 and 28, the pistons 49 and 50 are moved into the position shown in FIG. 4, the oil arriving from the pump 29 emerges through the conduit 63, passes between the base 64 and the piston 65 of the jack 62, and pushes the piston 65, lengthening the jack, while the oil present between the piston 65 and the head 61 of the jack 62 is conveyed through the conduit 60 towards the feed-tank 30.

Figure 5:
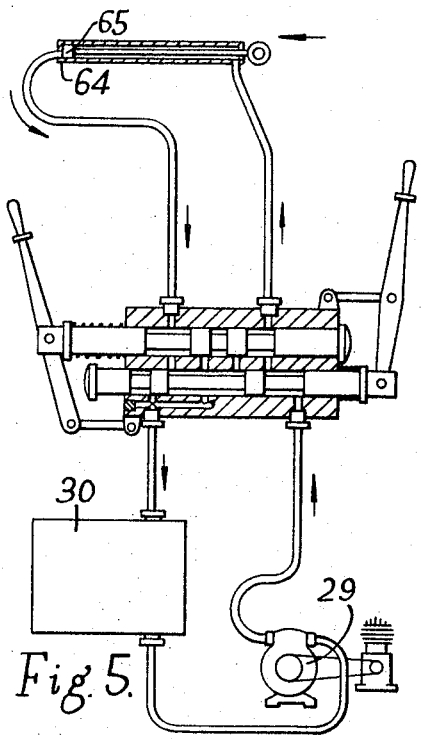

When the pistons 49 and 50 are moved into the position shown in FIG. 5, the compressed oil shown by the shaded portion of the diagram thrusts the piston 65 towards the base 64 of the jack 62, which is thereby shortened, while the oil present between the piston 65 and the base 64 follows the route shown by the dotted line, and returns to the feed-tank 30.

Figure 6:
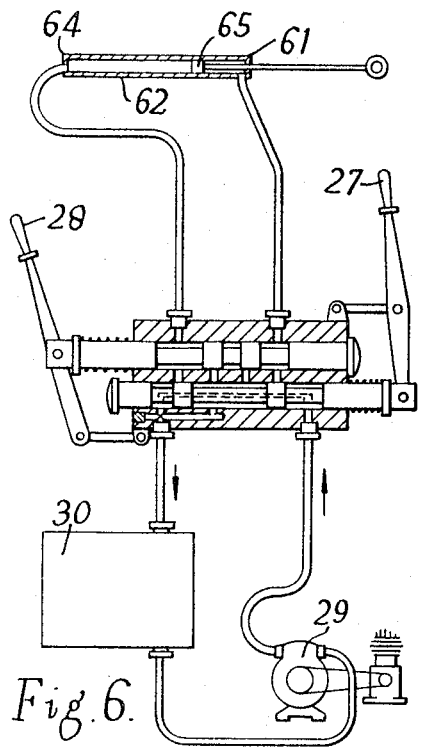

When the pistons 49 and 50 are placed in the position shown in FIG. 6, the oil is confined between the piston 65 and the base 64, as well as between the piston 65 and the head 61 of the pack 62, as shown by the shaded portion of the diagram, whereas the oil arriving from the pump 29 flows away under pressure and returns to the feed-tank 30, following the dotted line.

The piston 65 of the jack, being unable to move, keeps the jack in the position selected, and the jack 62 no longer varies in length.

Figure 7:
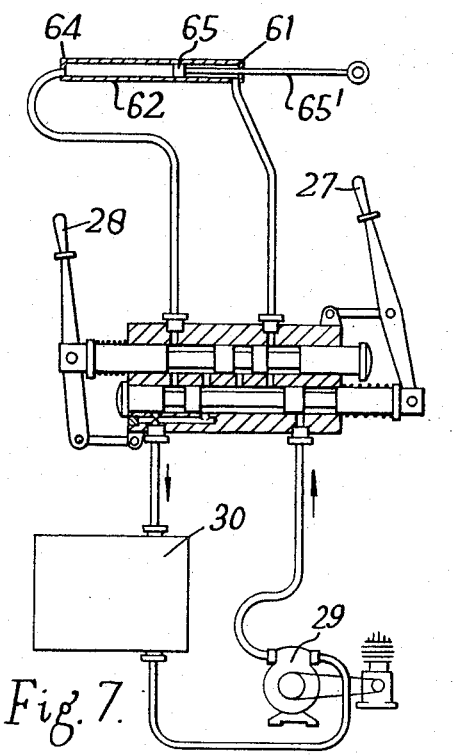

Finally, if on the contrary, the pistons 49 and 50 are moved into the position shown in FIG. 7, the oil present between the piston 65, the base 64 and the head 61 of the jack 62 is no longer confined, and can flow off under pressure, being conveyed freely towards the feed-tank 30, following the dotted line. The oil being under pressure, the piston 65 can move quite freely, and follows without resistance any impulsion to it by the bar 65' which connects it to the control-apparatus.

Owing to this distributor, the jack can be lengthened, shortened, locked or released as desired.

All these distributors can be combined in one block, the conduits 55 and 58 connecting them to the pump 29 and to the feed-tank 30 being inter-communicating. Use can be made of safety-devices, delivery-regulators, filters, etc.

It is thus possible to position a bridge over a gap and to withdraw it by the other end without the operator descending from the vehicle, as the bridge comprises no hydraulic device.

Referring to FIGS. 11 to 18, the control system for the jack 9 shown in FIGS. 11, 12 and 13 and for the jack 23 are such that the cone 21 can be moved into a position substantially parallel with the ground, as shown in FIG. 11. The sole purpose of the control system for the jack 25 is to enable it to be lengthened or shortened.

However, when the bridge is thrust into the ground, as shown in FIG. 12, the female cone 35 is no longer parallel with the ground, and at that moment it is no longer possible to introduce the male cone 21 into the female cone 35, since their longitudinal axes no longer lie in the same extension line.

To make them coincide, the operator has to descend from the truck and use accessories such as lifting jacks etc.

These drawbacks are eliminated by a further feature which makes it possible to take up the bridge even if the female cone is inclined at a steep angle in respect of the ground, as shown in FIG. 13.

All that is necessary is to place the head 26 of the cone 21 in the orifice of the cone 35. The operator moves the distributors of the jacks 23, 25 and 9 into the free position and causes the apparatus to move to the rear.

The three jacks are not restricted in any way, the cone 21, comes to rest on the ground and inserts itself in a natural manner in the cone 35, which acts as a guide for the former cone, and after the contact with the ground the cone 21 can be released from the cone 35 simply by placing the distributors of the jacks 23, 25 and 9 in the free position.

The system of articulated panels shown in FIG. 14 enables two bridges 32, 33 and 32', 33' to be laid side by side forming a continuous track from one side to the other, for vehicles of twice the weight.

Folding panels 37 consist of an element 66 (FIGS. 8 to 10) connected by the hinges 67 to the first fixed panel 68. The element 66 is connected by hinges 69 to a second element 70 which is itself connected by hinges 71 to a terminal element 72 forming an articulated deck 37.

When the bridge is placed in the transport position as shown in FIG. 8 the deck 37 is moved back, and to enable it to be wound up without catching, a sliding shoe 73 is provided under the panel 70, while the simple support 74 has been equipped with rubber tyred wheels 75 which at a certain moment enabled the deck 37 to pass without catching.

After the bridge has been laid the deck 37 is placed in position by the mere force of gravity on the recess 36, as the cone 21 is gradually withdrawn from the cone 35.

The elements 72, 70 and 66 of the deck 37 are produced from sections of a suitable lightweight alloy with considerable strength.

When the deck 37 covers over the recess 36 it rests on the rabbets 76 provided on each side of the box girders 77 and 78.

In order to ensure a small angle of inclination for the deck 37 positioned on the recess 36 the upper part 79 of the female cone 35 in indented and reinforced at the extreme points 80 and 81.

Figure 15:
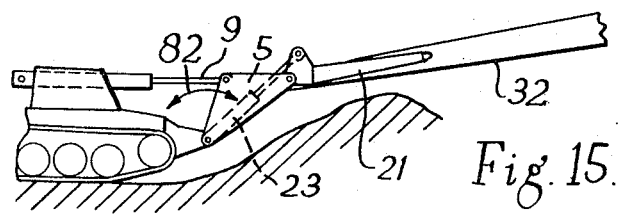

To enable these operations to be carried out the plane for the laying of the bridge sometimes forms very considerable angles with the plane supporting the bridge-laying operation, as shown in FIG. 15.

In this extreme case the jack 23 is opened out to the full and its piston comes to rest against the cylinder.

All the oil being expelled, the safety valve of this jack can no longer operate, but as it is still possible to contact the jack 9 it is possible to subject the shoe to flexural stresses far above those for which it has been designed, with the consequent risk of damage.

Furthermore, the jack 9, which enables the entire assembly to be raised, is subjected to conditions which enable it to develop a considerable force, since at that moment the radius 82 of its torque is at its maximum, whereas its safety valve has necessarily been calibrated for cases in which the radius 82 of its torque is at its minimum. The operation of shortening the jack 9 can result in the jack 23 being extended to the full, while the radius of the torque of the jack 9 reaches the maximum. It is therefore important to remedy these anomalies and to limit the action of the jack 9 to a constant operating torque.

This device consists of a differential valve 83 situated on the feed surface of the jack 9 and the transmitter 84 mounted between the jack 9 and the casemate of the truck.

The valve 83, shown in FIG. 18 consists of the body 85 of which the end is provided with the chamber 86 which receives the oil under pressure through a conduit 87 and conveys it into the jack through the conduit 88. This chamber comprises a seating 89 on which the clack-valve 90 comes to rest, a chamber 91 around the said clack-valve being connected to the feed reservoir of the pump by a conduit 92. The clack-valve 90 is held in position on its seating 89 by the tension of two springs 93 and 94 between which the piston 95 is intercalated.

The springs 93 and 94 are mounted in series and rest on the body 85 via a stop 96. The piston 95 slides in a cylinder 97 and in close contact with its walls, and the rod 98 of the clack-valve 90 passes through the base 99 of the said cylinder.

The cylinder 97 is connected by the conduit 100 to the transmitter 84.

This transmitter shown in FIG. 17 consists of a body 101 provided with a hermetic chamber 102, a piston 103 moving in the latter. This piston 103 is prolonged in the form of a control rod 104.

When the items of apparatus are in position the transmitter 84 is mounted on a fixed part of the bridge laying apparatus 2' in such a way that its rod 104 extended to the maximum, contacts the stop 105 affixed to the cylinder of the jack 9 at a certain distance from the pivoting axis of this jack.

The valve 83 already connected to the feed pump and to the jack 9 is connected to the transmitter 84 by a flexible tube 106.

The cylinder 102 of the transmitter and the cylinder 97 of the valve are filled with oil after the stop 96 has been tightened in such a manner that the tension of the springs 93 and 94 acting "tandem-wise" on the clack-valve 90 have been regulated so as to correspond to the maximum oil pressure calculated for the satisfactory operation of the apparatus even when the radius of the torque of the jack 9 is at its minimum.

Hence, as the jack 9 moves, increasing the radius 82 of its torque, the stop 105 rests to an increasing extent on the rod 104 of the piston 103 of the transmitter 84. The oil confined in the cylinder 102 is expelled into the cylinder 97 of the valve 83 and moves the piston 95, correspondingly reducing the pressuret exerted by the springs 93 on the clack-valve 90. The clack-valve is thus discharged and is able to respond to a pressure which is all the higher, the greater the movement which the jack 9 has performed. It follows that the pressure of the charge decreases as the radius 82 of the torque of the jack 9 increases, and this enables a constant operating torque to be obtained for the jack 9, whereas about this device this torque was able to increase, as the jack turned about its axis, until it reached levels which endangered the other part of the mechanism.

The further feature of the invention may accordingly be summarized as follows:

A hydro-mechanical device by which is is possible, on all types of terrain, to lay an extensible bridge over a gap and to take it up at the other end, characterized by:

(1) Individual distributing device eliminating the action of the oil in order to release the operating devices for the laying and removal of the bridge, thus enabling them to orientate themselves automatically without restriction, so that they can coincide in position with the organs of the bridge itself, whatever the angle formed by the bridge laying apparatus and the actual bridge.

(2) Folding panels capable of covering over the orifice normally required to enable the bridge to be taken up or laid, in order to ensure a continuous bridge surface from one side to the other, so that two bridges can be laid parallel, side by side, and used in such a manner that each of them need only support half the weight of the vehicle to be moved across the gap.

(3) Cone in the upper part of the large base, provided with an indentation, in order to ensure a moderate gradient for mounting the bridge.

(4) Valve system with differential action, of which the pressure varies according to the position of the main operating jack, in order to provide an invariable operating torque for the latter, thus ensuring that no operating parts will break in the event of the bridge assuming an abnormal position or being accidentally subjected to an excessive load.

The shapes, dimensions and arrangements adopted for the various elements may nevertheless vary within the limits allowed by equivalent apparatus, as may also the materials used for their manufacture, without thereby departing from the general principle of the invention described in the foregoing.

We claim:

1. A bridge-laying vehicle comprising: (a) a carriage, (b) a coupling device movably mounted on the carriage, (c) a bridge having two parts foldable about a common transverse axis, (d) first co-operating means on said coupling device and on the free end of each part of the bridge for supporting said bridge in liftable and lowerable manner on the carriage, and (e) second means on the coupling device and each part of the bridge for unfolding the bridge into extended position.

2. A bridge-laying vehicle, as claimed in claim 1, comprising support means movably mounted on the carriage and positioned to contact the ground adjacent to the coupling device to form a fulcrum between the carriage and the bridge when said bridge is extended.

3. A bridge-laying vehicle, as claimed in claim 1, wherein the first co-operating supporting means consist of a truncated conical male element on the coupling device and a corresponding conically shaped female element at the free end of each part of the foldable bridge, whereby the bridge and the carriage can be relatively rotated about the axis of said first co-operating supporting means.

4. A bridge-laying vehicle, as claimed in claim 1, wherein the second unfolding means comprise a driven element movably mounted on each part of the bridge and coupled by linkage to the respective other part of the bridge, and a driver element shiftably mounted on the coupling device, the driver element and the driven element being positioned so as to be in alignment when the bridge is supported on the coupling device.

5. A bridge-laying vehicle, as claimed in claim 1, wherein the coupling device comprises a first member pivotably mounted on the carriage for lifting and lowering with respect to the carriage, and a second member pivotably mounted on the first member, said second member carrying the co-operating supporting means and the unfolding means.

References Cited by the Examiner

UNITED STATES PATENTS

| | | | |
|---|---|---|---|
| 2,556,175 | 6/1951 | Frost | 14—1 |
| 3,105,251 | 10/1963 | Stevens | 14—1 |

FOREIGN PATENTS

| | | |
|---|---|---|
| 818,987 | 6/1937 | France. |
| 859,277 | 6/1940 | France. |

JACOB L. NACKENOFF, *Primary Examiner.*